May 26, 1936.  R. W. LEACH ET AL  2,042,066

VALVE

Filed Dec. 29, 1932  3 Sheets-Sheet 1

May 26, 1936.    R. W. LEACH ET AL    2,042,066

VALVE

Filed Dec. 29, 1932    3 Sheets-Sheet 2

Inventors
Robert William Leach
William Henry Bateman
by English Studwell
their Attorneys Patented May 26, 1936

2,042,066

UNITED STATES PATENT OFFICE 2,042,066

VALVE

Robert William Leach and William Henry Bateman, Newport, England

Application December 29, 1932, Serial No. 649,272
In Great Britain January 2, 1932

2 Claims. (Cl. 251—51)

This invention relates particularly to valves of the kind commonly known as sluice valves, but it is applicable to various forms of valves including both those in which the closure member becomes separated from its seating when the valve is opened, and those in which the closure member remains permanently in contact with its seating.

The object of the invention is to enable lubricating, sealing, cleansing or other fluid or plastic substance to be intermittently supplied in a convenient and effective manner to the working surfaces of the valve at a predetermined interval in each operation of the movable part of the valve.

The invention comprises the combination of a chamber for fluid substance, and means for forcing a quantity of the fluid substance from the chamber into distributing channels during each closing movement of the closure member.

In the three accompanying sheets of explanatory drawings:—

Figures 6–8 illustrate alternative formations of the distributing channels in the closure member or seating surfaces.

Figure 1:
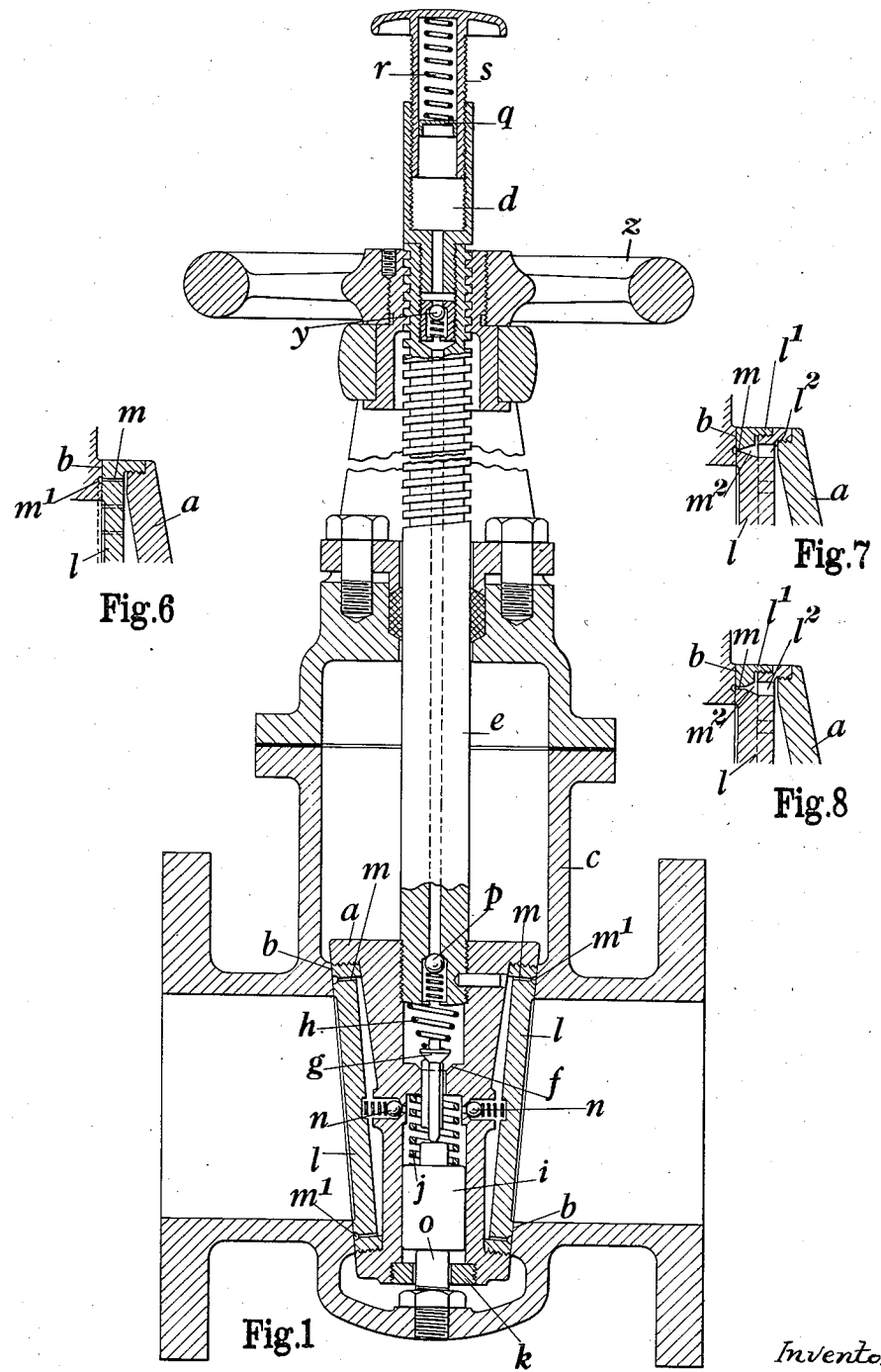
Figure 1 is a sectional side elevation of one form of valve provided with this invention.

In the application of the invention to a sluice valve as shown in Figure 1, in which a wedge-like movable closure member $a$ is arranged to co-operate with a pair of oppositely inclined fixed seatings $b$ in the body part $c$, the interior of the member $a$ is made hollow, and is adapted to serve as a chamber to which fluid can be supplied from a separate reservoir $d$ arranged at the outer end of the operating spindle $e$. The fluid contained in the reservoir may be a lubricating oil or grease, or it may be a plastic substance required for effecting a seal between the working surfaces of the valve, or it may be fluid suitable for cleansing the working surfaces. In the example illustrated, the hollow interior of the part $a$ is divided into two parts by the seating $f$ of a valve $g$, this valve being pressed towards its seating by a spring $h$. The lower part of the chamber in the part $a$ is of cylindrical form, and within it is arranged a slidable piston $i$ for forcing the fluid substance into distributing channels in the working faces of the closure member, the piston being moved in one direction by a strong spring $j$, this movement being limited by a shoulder $k$ in the part $a$.

The channels aforesaid may be provided in any convenient manner. In the example illustrated they are formed in each of the opposite faces of the closure member $a$ by a plate $l$ which is screwed or otherwise secured into a cavity in the said part and is formed with a ring of perforations $m$ in communication with a continuous annular groove $m^1$ in the working face, which groove is closed by the adjacent seating $b$ when the valve is closed. The fluid substance passes from the chamber containing the piston $i$ to the cavity behind each plate $l$ through an opening which is controlled by a spring loaded non-return valve $n$.

Figure 3:
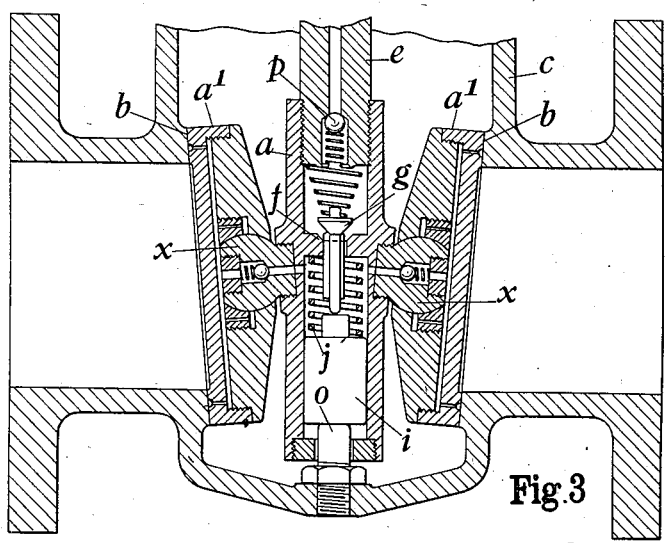

The formation of the distributing channels may be modified in a variety of ways. An alternative example is seen in Figure 3 and will be readily understood without further description. The form shown in Figure 6 is essentially similar to that shown in Figure 1, excepting that in this example the groove $m^1$ is formed in the seating face $b$ instead of on the closure member. In the example shown in Figure 7, the part $a$ has screwed on to it a plate $l$ shaped as shown, and on to the reduced periphery of this plate is screwed a ring $l^1$. The plate $l$ has holes $l^2$ formed in it to provide the required passages and these open into an annular groove $m^2$ having inclined sides which merge into a short and narrow annular outlet channel $m$. The example shown in Figure 8 differs from that of Figure 7 in that the annular groove $m^2$ is shaped to provide a longer narrow groove $m$.

On the interior of the body $c$ of the valve aljacent to the exposed end of the piston $i$ is arranged an abutment $o$ which during the closing of the valve comes into contact with the piston and forces it against the spring $j$ in the direction for displacing the fluid substance through the perforations $m$. In this movement the valve $g$ is also opened by the piston, displacement along the spindle $e$ towards the reservoir $d$ being prevented by the spring loaded non-return valve $p$.

During the opening movement of the valve, when the closure member $a$ is raised off its seatings $b$ by the spindle $e$ (which is operated by a handle $z$ acting on the screw threaded outer part of the spindle) the piston $i$ descends under the action of the spring $j$ and causes fluid substance to flow from the chamber $d$ past the valves $p$ and $t$ until the latter closes on its seating. Thereafter no fluid substance can pass to the perforations $m$ until the following closing movement of the valve when by the interaction of the piston $i$ an abutment $o$ a further quantity is displaced.

As regards the reservoir $d$, situated at the outer end of the valve spindle, this may be of any convenient form. In the example illustrated, it is fitted with a removable hollow screw plug s by rotation of which pressure can be applied to the lubricant. Within the plug is arranged a piston q which is backed by a spring r, the latter serving to advance the piston and maintain the supply of lubricant to the interior of the main valve part a. Periodic compression of the spring is effected by rotating the plug further into the valve stem.

Figure 2:
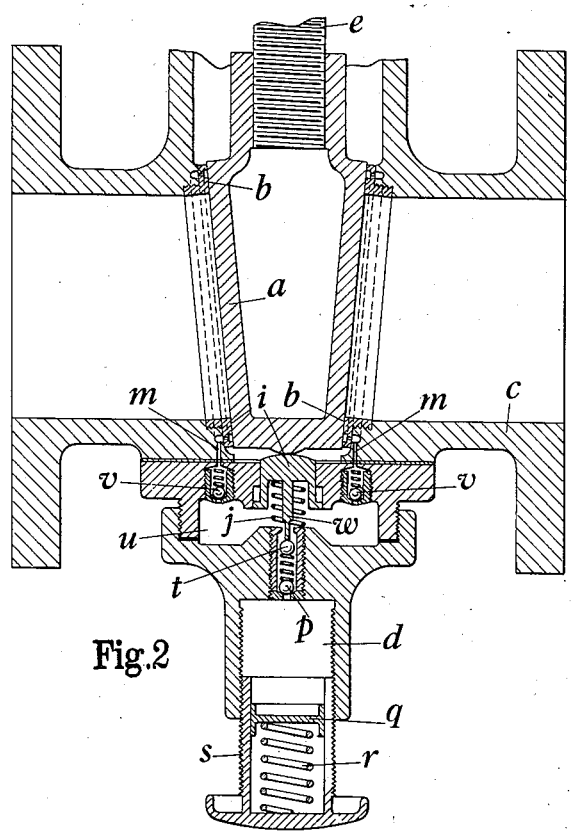
Figures 2 and 3 illustrate modifications of that form of the invention shown in Figure 1.

In the example shown in Figure 2, the lubricant chamber is arranged in the body c of the valve beneath the closure member a. Lubricant from a reservoir d (provided with a hollow plug s, piston q and spring r, as already described) communicates through non-return valves t, p, with a chamber u in one side of which is arranged a slidable piston i controlled by a spring j. The outlets m from the chamber are controlled by non-return valves v which permit flow of lubricant from the chamber u through the outlets m to passages in the seatings b of the body part c. When the closure member a is moved between the seatings into its closed position it engages the piston i and causes lubricant to be displaced from the chamber u to the seating surfaces. Also the valve t is opened by the projection w on the piston. During the withdrawal of the valve a from between its seatings lubricant can pass from d to u until the valve t closes. At the same time the piston i returns under the action of its spring j.

The modification shown in Figure 3, is essentially similar to the construction shown in Figure 1, and differs in that the closure member a is provided with separate faces $A^1$ for co-operating with the seatings b, the faces being connected to the part a by spherically shaped parts x on which the faces can swivel and thereby automatically adjust themselves to the seatings b.

Figure 4:
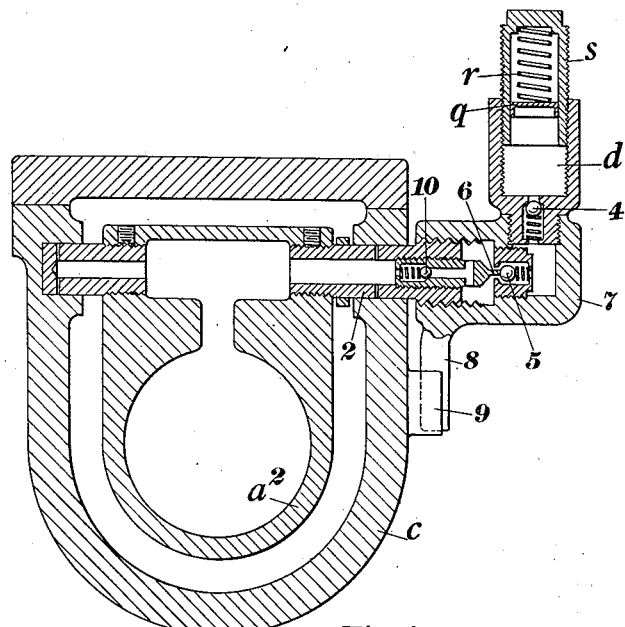
Figures 4 and 5 are sectional end and side elevations illustrating one aplication of the invention to a pivoted flap valve.
Figure 5:
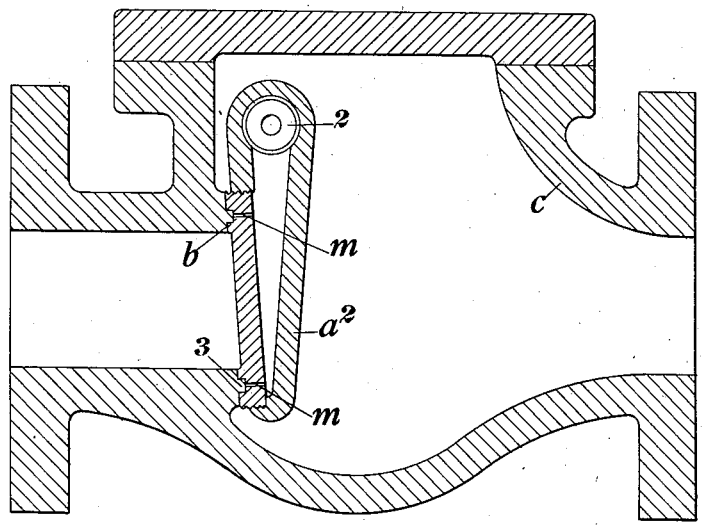

In the application of the invention to a pivoted flap valve as shown in Figures 4 and 5, we arrange within the body part c of the valve any suitable annular or other seating b, and in association with the seating we pivot a hollow flap $a^2$ which is attached to a hollow spindle 2 situated at the upper part of the flap. As the fluid tight seal between the contacting surfaces of the flap and seating is obtained largely by the lubricant or sealing substance supplied to the parts as hereinafter described, we prefer to provide an annular ridge 3 on one of the parts, for example, the seating, and a complementary groove in the other part, the lubricant being delivered by channels m as shown to the groove from the interior of the flap so that when the flap is closed the ridge becomes embedded in the lubricant. One end of the spindle projects beyond the body part and is externally screw threaded, and on this screw threaded part is mounted a hollow member 7. In this member adjacent to the outer end of the spindle is arranged a lubricant chamber. This chamber communicates with a reservoir d containing a screw plug s piston q and spring r as already described, and the communication between the said chamber and reservoir is controlled by opposed non-return valves 4, 5. The valve 5 can be pressed off its seating by a projection 6 on the adjacent end of the flap spindle. A non-return valve 10 is also provided in the hollow spindle as shown. Movement of the part 7 (containing the lubricant chamber and reservoir and the valves 4, 5) relatively to the casing c of the valve, is prevented in any convenient manner, such as by means of a lug 8 on the part 7 located between a pair of projections 9 on the part c. The projections 9 are removably secured on the casing c and are secured thereon after the part 7 has been threaded on the spindle 2.

The device is such that during the closing of the flap on to its seating by gravity or return motion of the fluid controlled by the flap, the relative axial movement of the part 7 and the flap spindle 2 causes lubricant to be forced from the compartment adjacent to the spindle end into the interior of the flap, whence it can pass to the outer face of the flap, and into any other distributing passages in the valve. During this movement which is caused by the screw thread connection between the spindle 2 and the part 7, the valve 5 is pressed off its seating by the projection 6. But during the opening movement of the flap the relative axial movement of the spindle and part 7 is such that pressure on the lubricant in the flap is relieved, and a further supply can pass into the aforesaid chamber from the reservoir d under the action of the piston q until the valve 5 is closed. As no pressure is exerted on the lubricant when the valve is open undesirable leakage cannot occur. Return flow of lubricant from the interior of the flap is prevented by the non-return valve 10. Consequently the lubricant supply is controlled in a very simple and convenient manner, and lubricant is only forced through the passages during the closing movement.

The invention is not limited to the examples described as subordinate mechanical details can be varied to suit different requirements. Moreover, the invention is applicable to slidable or rotatable valves in which the closure member remains in permanent contact with its seating when moved to and from the closed position, but in all cases the fluid control device operates to close the communication between the reservoir and the valve surfaces when the valve is opened and reestablishes the communication at a suitable interval in the closing movement.

By this invention the maintenance of a supply of lubricant or other fluid on the seating surfaces of the valves is effected automatically in a simple and convenient manner.

Having thus described our invention what we claim as new and desire to secure by Letters Patent is:—

1. In valves of the sluice type, the combination of a hollow closure member movable onto and away from a seating, said closure member being provided with lubricant distributing channels connecting the interior of the closure member with the working surfaces of said member, a lubricant reservoir in communication with the interior of the closure member, a spring-controlled piston in the closure member, a fixed abutment by which engagement with the piston during the closing movement of the closure member causes the piston to force lubricant out of the interior of the closure member and through the distributing channels to reach the working surfaces of the closure member, and valve means for controlling communication between the lubricant reservoir and the interior of the closure member.

2. In valves of the sluice type, the combination of a closure member having a central hollow portion, parts pivotally connected to the central hollow portion and having surfaces movable to and from a seating, the central hollow portion and the seat-contacting parts having connected lubricant-distributing channels communicating with the interior of the central hollow portion, a lubricant reservoir in communication with the interior of the central hollow portion, a spring-controlled piston in the central hollow portion, a fixed abutment by which engagement with the piston during the closing movement of the closure member causes the piston to force lubricant through the distributing channels to reach the working surfaces of the seat-contacting parts, and valve means for controlling communication between the lubricant reservoir and the interior of the central hollow portion of the closure member.

ROBERT WILLIAM LEACH.
WILLIAM HENRY BATEMAN.